United States Patent
Dewan et al.

(10) Patent No.: US 10,516,651 B2
(45) Date of Patent: Dec. 24, 2019

(54) SECURELY ROUTING SENSOR DATA FROM SENSORS TO A TRUSTED EXECUTION ENVIRONMENT (TEE)

(71) Applicant: Intel IP Corporation, Santa Clara, CA (US)

(72) Inventors: Prashant Dewan, Portland, OR (US); Uttam K. Sengupta, Portland, OR (US); Kumar N. Dwarakanath, Folsom, CA (US); Elad Eyal, Shoham (IL)

(73) Assignee: Intel IP Corporation, Santa Clara, CA (US)

( * ) Notice: Subject to any disclaimer, the term of this patent is extended or adjusted under 35 U.S.C. 154(b) by 77 days.

(21) Appl. No.: 14/978,186

(22) Filed: Dec. 22, 2015

(65) Prior Publication Data

US 2017/0180386 A1 Jun. 22, 2017

(51) Int. Cl.
*H04L 29/06* (2006.01)
*G09C 1/00* (2006.01)

(52) U.S. Cl.
CPC .......... *H04L 63/0428* (2013.01); *G09C 1/00* (2013.01); *H04L 2209/127* (2013.01); *H04L 2209/601* (2013.01)

(58) Field of Classification Search
CPC .................. H04L 63/102; H04L 63/0428
See application file for complete search history.

(56) References Cited

U.S. PATENT DOCUMENTS

| 8,887,245 B1 * | 11/2014 | Wiltzius ............. H04L 63/1433 726/25 |
| 9,069,952 B1 | 6/2015 | Paczkowski et al. |
| 2006/0242295 A1 * | 10/2006 | Husemann ......... G06F 19/3481 709/224 |

(Continued)

FOREIGN PATENT DOCUMENTS

| CN | 108432204 A | 8/2018 |
| DE | 112016005883 T5 | 9/2018 |

OTHER PUBLICATIONS

"International Application Serial No. PCT/US2016/063474, International Search Report dated Feb. 24, 2017", 5 pgs.

(Continued)

*Primary Examiner* — Chau Le
*Assistant Examiner* — Vance M Little
(74) *Attorney, Agent, or Firm* — Schwegman Lundberg & Woessner, P.A.

(57) ABSTRACT

Various configurations and methods for providing a secure transfer of data from computing device sensors to a Trusted Execution Environment (TEE) are disclosed. As disclosed, various data flows, data sequences, and configurations are provided to allow sensor data to maintain integrity and confidentiality while being accessed by trusted agents of a TEE. In an example, a microcontroller-based TEE is operated to communicate with a sensor hub via a secure hardware channel. The microcontroller-based TEE is configured to receive the sensor data via the secure hardware channel, and communicate the sensor data to other trusted agents in the computing system via secure communications. Other (Continued)

variations of secure communications among multiple sensors, trusted agents, TEEs, and third party services are also disclosed.

22 Claims, 7 Drawing Sheets

(56) References Cited

U.S. PATENT DOCUMENTS

| | | | | |
|---|---|---|---|---|
| 2012/0096288 | A1* | 4/2012 | Bates | G06F 1/206 |
| | | | | 713/320 |
| 2012/0254878 | A1* | 10/2012 | Nachman | G06F 9/5094 |
| | | | | 718/102 |
| 2014/0075496 | A1* | 3/2014 | Prakash | G06F 21/6218 |
| | | | | 726/1 |
| 2014/0317686 | A1 | 10/2014 | Vetillard | |
| 2015/0079933 | A1* | 3/2015 | Smith | H04W 4/02 |
| | | | | 455/411 |
| 2015/0341332 | A1 | 11/2015 | Smith et al. | |
| 2015/0348026 | A1* | 12/2015 | Roberts | G06Q 20/10 |
| | | | | 705/71 |
| 2015/0381575 | A1* | 12/2015 | Bhargav-Spantzel | |
| | | | | H04L 63/0428 |
| | | | | 713/168 |
| 2016/0056964 | A1* | 2/2016 | Andiappan | H04L 9/3263 |
| | | | | 713/189 |
| 2016/0087976 | A1* | 3/2016 | Kaplan | H04L 63/0823 |
| | | | | 713/156 |

OTHER PUBLICATIONS

"International Application Serial No. PCT/US2016/063474, Written Opinion dated Feb. 24, 2017", 6 pgs.

* cited by examiner

SECURELY ROUTING SENSOR DATA FROM SENSORS TO A TRUSTED EXECUTION ENVIRONMENT (TEE)

TECHNICAL FIELD

Embodiments described herein generally relate to the communication and processing of data in computer systems, and in particular, to the communication and processing of data from sensors to a Trusted Execution Environment of the computing system.

BACKGROUND

Trusted Execution Environments (TEEs) are increasingly used as a way to ensure security for applications and data on a computing system. A TEE may be used, for example, to establish an isolated execution environment and associated sections of memory where operations may be conducted on sensitive data, invisibly to the rest of the system. Multiple TEEs may be deployed and used on a computing system, such as with the use of various host-based TEEs and microcontroller-based TEEs. Such TEEs may vary in properties and capabilities, as some microcontroller based TEEs are persistent but host-based TEEs (such as a virtual machine (VM)) may be either persistent or transient.

Computing devices, and in particular, mobile and wearable computing devices (e.g., smartphones, tablets, smartwatches), often include a number of sensors. For example, such sensors may include location data sensors (e.g., obtaining GPS, Wi-Fi location data) and environment sensors such as a gyroscope, an accelerometer, and the like. Although the number and use cases for such sensors has increased, there are not adequate existing mechanisms to securely provide data from the sensors on a computing device platform to trusted agents running inside a TEE.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
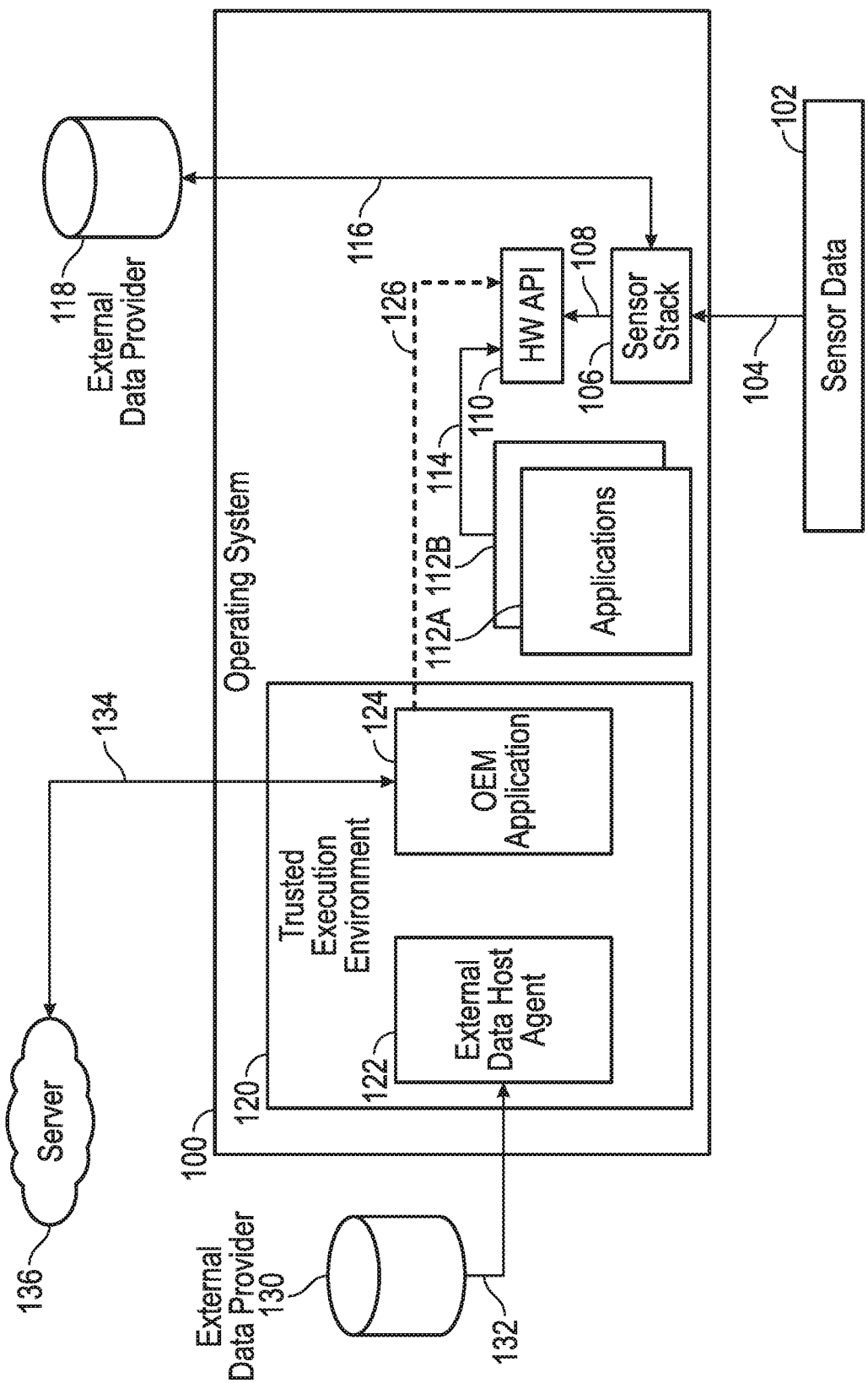
FIG. 1 illustrates a diagram of a computing system architecture implementing a host-based Trusted Execution Environment, according to an example.

In the following description, methods, configurations, and related devices and apparatuses are disclosed that provide for the secure transfer of data from sensors on a computing device platform to a Trusted Execution Environment (TEE). Specifically, the following description includes various examples of data flows, data sequences, and configurations that allow data to maintain integrity and confidentiality while being accessed by trusted agents of a TEE. Such trusted agents of a TEE may be persistent or transient, and may support receiving sensor data with the present examples through a pull or push model.

The number of sensors on computing platforms are increasing and becoming smarter. As more sensors collect personal and sensitive data that is increasingly being transmitted to the cloud, it is becoming more important to secure the "first mile" of the journey of data from the sensor. The presently described techniques address this concern and related security issues, through the use of secure communication and processing between respective sensors and TEEs. As discussed herein, the present techniques enable sensor data to be consumed by multiple TEEs in a secure way, and enable the trusted agent(s) running in the multiple TEEs to further communicate the sensor data to the cloud or other locations as needed.

Within computing systems, there is a need to securely provide the data from sensors to trusted agents running inside a TEE in a way that ensures integrity and confidentiality. Because sensor data may include Personally Identifiable Information (PII) or other confidential data, there is a significant need to protect sensor data from malware or unauthorized programs as it is processed or communicated within a particular computing platform. As discussed herein, the present techniques provide the benefits of secure and hidden operations of a TEE through the use of trusted agents, while also securely communicating data from the multiple originating sources of sensor data to such trusted agents.

The sensors used in a mobile computing device, for example, may include location data sensors such as GPS, Wi-Fi, or LTE sensors, biometric data sensors such as fingerprint, microphone, or camera sensors, and environment data sensors such as a gyroscope, accelerometer, thermometer, and the like. Thus, the concern for security becomes particularly complex due to the presence of multiple TEEs on the platform (including both host-based TEEs and microcontroller-based TEEs), the multiple sensors providing data to and from such TEEs, and the complexity and variation in sensors and types of sensor data.

As described herein, the presently disclosed techniques and configurations include a mechanism in which secure sensor data may be exchanged using a secure connection between a persistent microcontroller-implemented TEE and a "sensor hub." As further described herein, this hub-based approach may be used coordinate communications of secure sensor data from a common location to the microcontroller TEE. The microcontroller TEE may then communicate the secure sensor data to other TEEs and trusted agents of the computing platform, including other persistent or temporary TEEs, without interception or interference from malware or other untrusted agents.

Existing techniques that attempt to secure sensor data may involve assigning a sensor controller to communicate with a particular TEE and switching secure communications to the sensor controller on demand. The assignment of respective sensor controllers to the particular TEE leads to a sub-optimal (and expensive) use of the sensors and sensor controller, and is error-prone because two TEEs might need the sensor data simultaneously. The techniques described herein address these shortcomings by exposing a unified set of application programming interfaces (APIs) to host-based and microcontroller-based TEEs that consume sensor data. In an example, such a unified set of APIs is exposed from a controlling TEE, such as a single microcontroller-based TEE, that receives the sensor data directly from a sensor hub via a separate hardware interface. As a result, the sensor hub and any associated sensors and sensor controllers may remain security agnostic, and in some examples, such sensors and sensor controllers do not need to incorporate heavy duty cryptographic firmware or security logic.

FIG. 1 illustrates a diagram of a computing system architecture implementing a host-based TEE, according to an example. As shown in FIG. 1, a TEE 120 (e.g., a virtual machine) operates within an operating system 100 to execute one or more trusted agents (e.g., applications) in a secure space. The TEE 120 may be used to define a secure area of operation in the computing system that is not snoopable (e.g., detectable or interceptable).

Various approaches to implement the TEE 120 may be used depending on the relevant hardware architecture. For example, ARM®-based processor architectures may implement the TEE 120 using TrustZone® technology features, so that other applications of the operating system 100 executing outside of the TEE 120 do not see applications or data operating inside a trusted zone. Also for example, Intel®-based processor architectures may implement the TEE 120 using Intel® Software Guard Extensions (SGX) features such as secure enclaves, or using Intel® Virtualization Technology (VT) to create the TEE as a virtual machine or sequestered memory that is not visible to the OS and applications. In either architecture, the TEE 120 provides an undetected and un-interfered environment for applications and associated data. It will be understood that the techniques described herein, however, are applicable to a variety of TEE implementations and other hardware architectures.

As further shown in FIG. 1, a set of sensor data 102 is provided in a data flow 104 to a sensor stack 106 of the operating system 100, outside of the TEE 120. This sensor stack 106, which may include drivers and communication components, may further provide the sensor data 102 in a data flow 108 to a hardware API 110. For example, one or more software applications 112A, 112B may request the sensor data 102 with use of the hardware API 110 via a data flow 114. The sensor stack 106 may further communicate data to (and from) an external data provider 118—external to the operating system 100—via a data flow 116.

The operation of the TEE 120 within the operating system 100 may include the operation of various trusted agents, such as the depicted operation of an OEM application 124 and an external data host application 122. For example, the OEM application 124 may execute as a trusted agent in the TEE 120, with capabilities to communicate data to a cloud server 136 via data flow 134. Also for example, the external data host application 122 may execute as a trusted agent in the TEE 120, with capabilities to collect and process data from an external data provider 130 via a data flow 132. In an example, the external data host application 122 may configure a sensor connected to the computing system using command and configuration data from an external data provider 130 received via the data flow 132.

As shown in FIG. 1, although the TEE 120 (and the OEM application 124 and external data host application 122) may access the sensor data 102 via the hardware API 110, the sensor data 102 will be exposed within the operating system 100. Thus, while the configuration of FIG. 1 provides security for the trusted agents inside the TEE 120 and data flows directly with the TEE 120 (for example, by securely communicating data from the TEE 120 to the cloud server 136 and from the external data provider 130), it is possible for the sensor data 102 to be intercepted within unsecure portions of the operating system 100 and the computer system as a whole before the sensor data arrives at the TEE 120.

Figure 2:
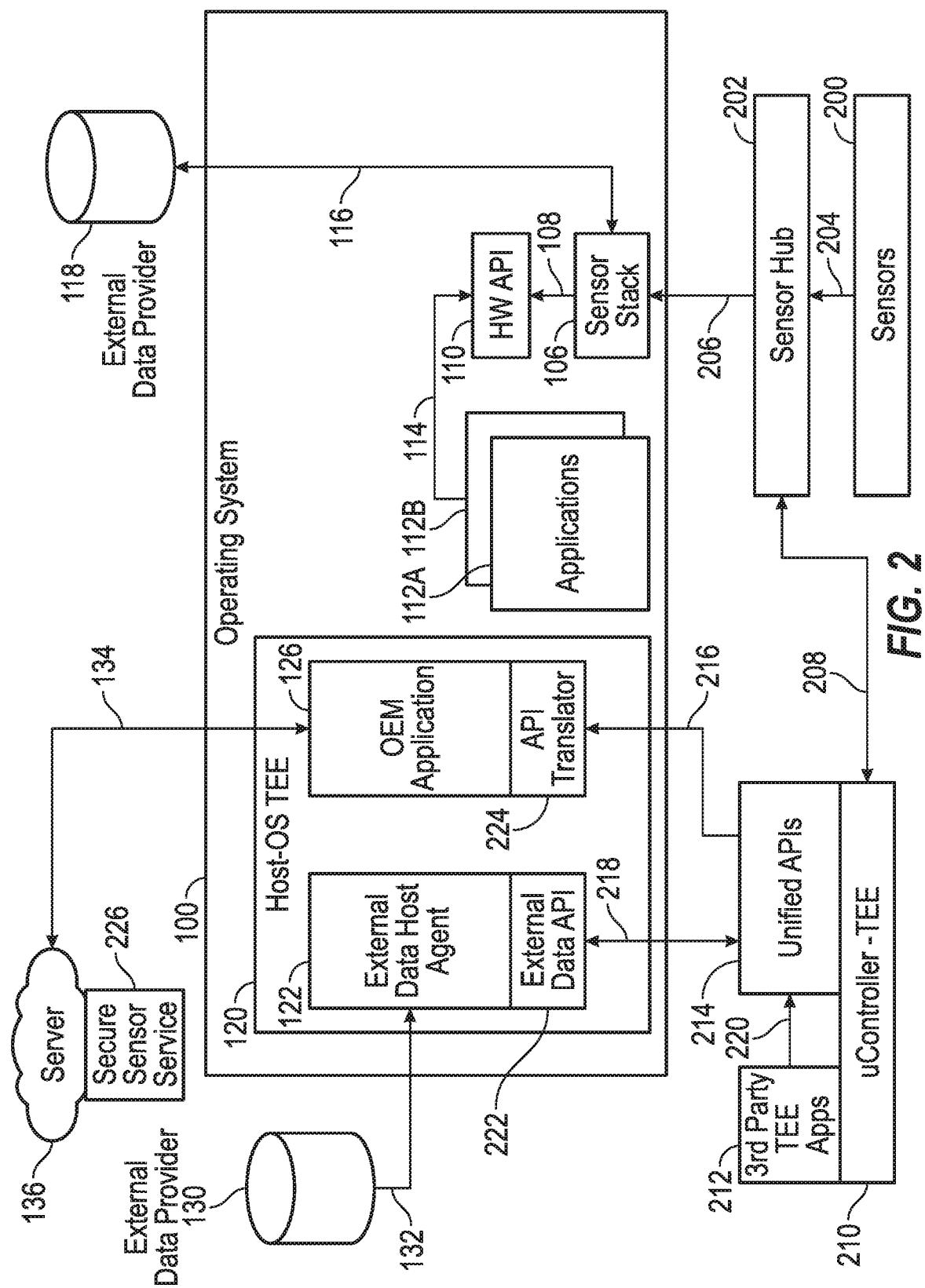
FIG. 2 illustrates a diagram of a computing system architecture implementing controlled data flows with host-based and microcontroller-based Trusted Execution Environments, according to an example.

FIG. 2 illustrates a diagram of a computing system architecture implementing controlled data flows with host-based and microcontroller-based TEEs, according to an example. The diagram of FIG. 2 extends the environment of FIG. 1, further depicting a sensor hub 202 for coordinating sensor data communications, and a microcontroller-based TEE 210 used to coordinate the communication of secure sensor data with other TEEs. In an example, the microcontroller-based TEE 210 is instantiated and operated by a microcontroller, in contrast to the host-OS TEE 120 that is instantiated and operated by an operating system and an associated processor (e.g., CPU).

The sensor hub 202 includes a direct hardware interface to the microcontroller-based TEE 210. For example, the sensor hub 202 and the microcontroller-based TEE 210 may share a protected hardware channel, which facilitates a data flow of secure sensor data over protected hardware channel 208. This channel and the data flow over this channel is further detailed in FIG. 3 below.

The microcontroller-based TEE 210 obtains secure sensor data from the sensors 200 via the sensor hub 202 (via data flows over a sensor hardware channel 204 and the protected hardware channel 208), and the microcontroller-based TEE 210 may subsequently serve the secure sensor data to other TEEs via a secure interface. For example, as described below, the microcontroller-based TEE 210 may expose a set of unified APIs 214 to allow other persistent or non-persistent TEEs to access the secure sensor data of collected at the sensor hub 202, and exchange secure communications from such other TEEs with the sensor hub 202.

In an example, the microcontroller-based TEE 210 executes firmware to host the unified APIs 214, process data requests from other TEEs received with the unified APIs, and forward such data requests to the sensor hub 202, and vice versa. For example, the TEE 120 (a Host-OS TEE) is shown as connecting to the microcontroller-based TEE 210 via data flows 216, 218 to the unified APIs 214. Such functionality may be enabled in the TEE 120 through an external data API 222 operating with the external data host application 122, or an API translator 224 operating with the OEM application 126. Additionally, in some examples, other TEEs of the computing system (not shown) may also connect to the unified APIs 214.

From this configuration, the sensor hub 202 securely shares the data with the microcontroller-based TEE 210. The microcontroller-based TEE 210 is subsequently responsible for securely sharing the data with the appropriate trusted agent of a TEE using the unified APIs 214. As a result, one (or multiple) TEEs may securely use the unified APIs 214 to request and access the secure sensor data of the sensor hub 202.

In an example, trusted agents executing on the microcontroller-based TEE 210 may also use the secure data obtained from the sensors 200 through the unified APIs 214 and the sensor hub 202. For example, third party TEE applications 212 and like trusted agents may operate in the microcontroller-based TEE 210 to request data from the unified APIs through a data flow 220. Examples of third party TEE applications may include applications performing security functions for one-time passwords, generating hashes and concatenating to payloads, encrypting payloads, and the like. Although some of the data flows of FIGS. 1 and 2 are illustrated in a unidirectional (or bidirectional) fashion, it will be understood that modifications to the applications, data services, data providers, and communications may be modified to perform either unidirectional or bidirectional data and command flows.

In addition to the retrieval of secure sensor data, the presently disclosed configuration provides a mechanism to secure other communications to the sensor hub 202, allowing a sensor configuration or other command to the sensor to be communicated through the same secure data flow (over the protected hardware channel 208). This may be performed in an efficient manner, as in some examples, the sensor hub 202 directly implements the commands and updates received from the microcontroller-based TEE 210 without needing to authenticate the originating trusted agent (because the microcontroller-based TEE 210 and the unified APIs 214 may include separate security features to authenticate the originating trusted agent).

In an example, the sensor hub 202 may serve as an "uber-microcontroller" for coordinating secure communications from among a large number of sensors. Additionally, the sensor hub 202 may coordinate communication to the sensor stack 106 for unsecure data, using the data flow 206 to the sensor stack 106, for consumption by applications 112A, 112B, as discussed in FIG. 1. In a further example, the sensor hub 202 includes multiple interfaces with other blocks in a SOC such as a host CPU, a security engine (e.g., implemented by the microcontroller for the microcontroller-based TEE 210) or an audio engine, using a mechanism called Inter-Processor Communication (IPC) to interact (control and data exchange) with these other blocks. For example, when the sensor hub 202 receives a request for specific sensor data via a host CPU IPC, the sensor hub 202 may consider this request as a non-secure request, so that data continues to be communicated up to the host side application in the clear with the data flow 206. However, if the request for sensor data comes via a security engine IPC via the data flow over the protected hardware channel 208, the sensor data may be handled by the microcontroller-based TEE 210 and appropriately protected for integrity and confidentiality. Thus, in the data flows depicted in FIG. 2, the request for secure sensor data in the host operating system 100 can originate only from a secure application (such as the OEM application 126) running in a host-side TEE (such as the TEE 120).

Accordingly, the sensor hub 202 enables a multitude of the sensors 200 to provide data to multiple TEEs securely in an M×M mapping. This saves the work of isolating sensors and sensor controllers to individual TEEs or having to dynamically switch between TEEs and sensors. In addition, the use of the sensor hub 202 also removes the need for multiple sensor interfaces, and supports communications of sensor data using both push and pull models.

The data flows and communications that are performed between the TEEs may be secured to prevent malicious tampering and interception. In an example, a security technique is initiated as the TEE 120 shares a symmetric keyset with the firmware of the microcontroller executing the microcontroller-based TEE 210. This keyset may be distributed to the TEE 120 and microcontroller-based TEE 210 at boot time (for example, by CPU microcode such as uCode, or by an entity such as UEFI/BIOS firmware delegated by the CPU microcode). At the time that the keyset is distributed, only the distributing entity should be executing on the platform, whereas the receiving entity should be loaded but not executing on the platform.

As indicated above, the unified APIs 214 may communicate with the trusted agents of TEEs in the computing system to offer a secure mechanism by which to receive or transmit sensor data and related sensor configuration settings. The following describes mechanisms by which the various agents depicted in FIG. 2, OEM application 126 and the external data host application 122 of the TEE 120, operate to communicate via the unified APIs 214 via data flows 216 and 218 respectively.

In an example, the external data host application 122 collects configuration data from external data providers (such as the external data provider 130) and communicates the configuration data, via the unified APIs 214, through the microcontroller-based TEE 210, which in turn communicates the configuration data to one or more of the sensors 200 via the sensor hub 202. For example, sensor calibration data may be sent through this communication channel. The external data host application 122 may authenticate the external data provider 130 in an SSL session, for example, by verifying security certificates of the external data provider 130.

In an example, the OEM application 126 requests sensor data of one or more sensors 200, via the unified APIs 214 from the microcontroller-based TEE 210, which in turn acquires the sensor data from the sensor hub 202. In addition, the OEM application 126 and other trusted agents may register for the sensor events from the microcontroller-based TEE 210, so that in response to sensor events, the microcontroller-based TEE 210 may be notified by the sensor hub 202. The microcontroller-based TEE 210 may subsequently multicast the event and the corresponding data to registered trusted agents.

As a result, the external data host application 122 and the OEM application 126 may operate to communicate end-to-end secure sensor data with external locations. For example, the data flow 132 and the data flow 134 may be established as SSL channels that are used by the respective trusted agents either to acquire the data from the cloud or send data to the cloud. Also for example, for data flow 134, the cloud server 136 may be authenticated by the trusted agent (the OEM application 126) to access a secure remote sensor service 226, whereas for data flow 132, the external data provider 130 may authenticate the requesting trusted agent (e.g., the external data host application 122) and the TEE (e.g., the TEE 120 executed by the host-OS).

With the configuration depicted in FIG. 2, two important objectives are addressed. First, this configuration ensures that secure sensor data is arriving from multiple of the sensors 200, but is not being distributed or stored unsecurely within the platform and susceptible to injection attacks. Second, this configuration ensures that secure sensor data with certain properties is accessible to only the right party and trusted agent, delegating the role of gatekeeper at the microcontroller-based TEE 210 rather than at the sensor hub 202 or sensors 200.

Secure sensor data that is sent to the cloud server 136 or other external data locations may be identified as originating from a secure source. In an example, the computing device may transmit the sensor data to the cloud server 136 that includes an indication that the sensor data has been securely locked down, so the remote sensor service 226 knows that the data has only been handled by trusted environments. Such data that is verified as secure may be of increased value to cloud services or to third parties, as a hardware-based verification that the sensor data has not tampered with.

Additionally, the presently described configuration provides a direct benefit to other applications in the device to verify that certain sensor data exchanged inside the computing system is secure. Thus, when the sensor hub 202 is sending secure data, such secure data will be received and processed by the microcontroller-based TEE 210, and unsecure software does not have access to the direct, secure connection with the microcontroller-based TEE 210. With the present techniques, the secure data path is protected, so secure sensor data may be passed on to the correct parties, fully protected along the way. In an example, the microcontroller-based TEE 210 is physically separate from the main CPU, so it is capable of increased security properties and may be isolated from execution of other software code. In other examples, various features of the techniques described above may be allocated to secure execution operations of the CPU or other microcontrollers or processors.

Figure 3:
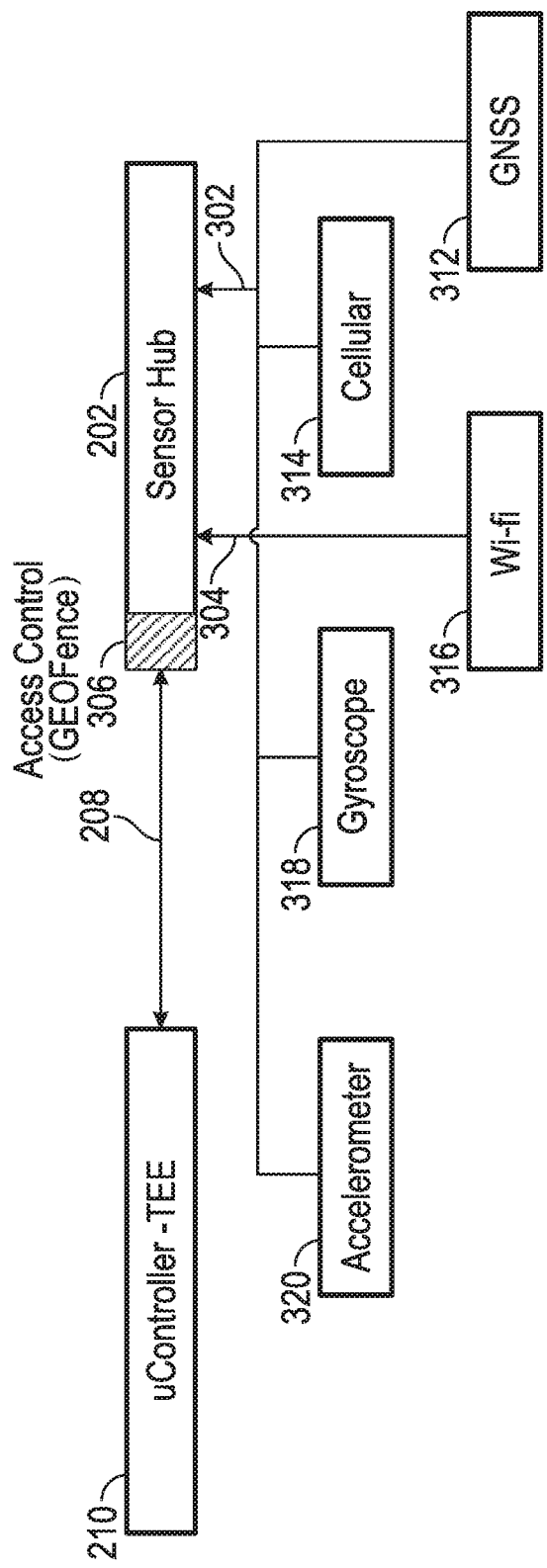
FIG. 3 illustrates a diagram of data flows with sensors and a microcontroller-based Trusted Execution Environment, according to an example.

FIG. 3 illustrates a diagram of data flows with sensors and a microcontroller-based TEE, according to an example. In this diagram, the microcontroller-based TEE 210 is configured to receive data from the sensor hub 202, using a data connection over the protected hardware channel 208 as described above with reference to FIG. 2.

As shown in FIG. 3, a number of sensors are connected to the sensor hub 202, including a cellular communications chipset 314, a Wi-Fi communications chipset 316, a Global Navigation Satellite System (GNSS) communications chipset 312, a gyroscope sensor 318, and an accelerometer sensor 320. In an example, all sensors of the computing device are connected to the sensor hub 202. The sensor data that is provided to the sensor hub 202 may include all or a portion of the data communications generated by the respective sensors and associated sensor controllers. In a further example, the sensor hub 202 may obtain data from motion sensors (e.g., accelerometer 320, gyroscope sensor 318, in addition to other sensors such as a compass or pressure sensor) and combine the motion sensor data with communications sensor data (e.g., GNSS data, Wi-Fi data, or cellular data from the GNSS communications chipset 312, the Wi-Fi communications chipset 316, or the cellular communications chipset 314, respectively). The creation of such combined data, referred to as sensor data fusion, may be used to provide a more accurate and always-available geolocation data (such as for indoor usage). Thus, data from motion sensors can generate dead reckoning information that is used to augment or compensate data from communication sensors when satellite connections are lost indoors or in urban canyons.

A variety of other sensors not depicted in FIG. 3 (such as sensors responsible for collecting biometric data) may also be connected to the sensor hub 202. Many of the connections between the various sensors and the sensor hub 202 are likely to be low bandwidth (for example, in the order of 10s of KB/sec). In an example, communications from the various sensors to the sensor hub 202 may occur over a dedicated data channel 304, or over a shared data channel 302. In some examples, communications from the various sensors to the sensor hub 202 may support push or pull mechanisms.

In some examples, the data channels 302, 304 between the sensors and the sensor hub 202 are not secured. The interfaces of the data channels 302, 304, however, are not exposed to the operating system or executing software, and hence cannot be attacked by malicious system software. Further, as discussed with reference to FIG. 2, the sensor hub 202 and the microcontroller-based TEE 210 may share the protected hardware channel 208.

In an example of a System-on-Chip (SoC) configuration, the protected hardware channel 208 may be established as a special channel between the two entities that cannot be sniffed by any other party in the SoC or system architecture. The protected hardware channel 208 has physical termination and both end points know the entity at the other end of the channel, so no authentication is performed between the sensor hub 202 and the microcontroller-based TEE 210. Further, other components in the SoC cannot spoof either of the two entities on the two ends of the channel.

As a result of the previously described configurations and techniques, certain sensor data may be secured from the sensor hub 202, while other data may be allowed to be transmitted into the regular sensor stack. The configuration of the sensor hub 202, and what types of data to secure may be dependent on the conditions established by the microcontroller-based TEE 210, and the origin of the request from the IPC or from the microcontroller-based TEE 210.

In an example, the security techniques may be used with a location-based geofence access control 306, which is configured to ensure secure access to certain types of data in the sensor hub 202. For example, data relating to certain types or origins of sensor data (such as camera or microphone data, from camera and microphone sensors) may require secure communication to trusted agents via the microcontroller-based TEE 210, based on GPS location coordinates that are determined from the GNSS communications chipset 312 (GPS sensor). Thus, unless the requesting application is running in the host side TEE (e.g., applications 122, 126 depicted in FIGS. 1 and 2), such data would not be made available to the untrusted host side application (e.g., applications 112A, 112B depicted in FIGS. 1 and 2).

In an example, certain types of data or certain types of sensors may be controlled based on a geofence or like conditions. For example, secure data and trusted agent processing of location sensor data may be required within (or, outside) a geofence, whereas other data relating to other sensors (e.g., ambient light sensor, or accelerometer) may be communicated to the normal sensor stack. The establishing of any form of access control over the sensor data may be configured by the microcontroller-based TEE 210 and enforced by the sensor hub 202. This access control may occur after a host-side TEE application conducts a provisioning process that communicates specific policies to the sensor hub 202 to set the access control conditions. Examples of such access control conditions may include: when within a geo-fence, do not provide location data via the non-secure path (or do not provide camera or other specific sensor data); or, when a user is entering a PIN number or password, do not provide camera, audio, or accelerometer data via a non-secure path.

The presently disclosed configurations and techniques may be utilized for securing a variety of types of sensor data. For example, location data obtained from location-based sensors may have significant privacy and security implications. Thus, if a user is trying to provide location data to a trusted remote service, protecting the location data may be very important for the remote service. As a result of the techniques described above, communications may be exchanged while ensuring that only an authorized service provider has access to such location data (and that such location data is protected from tampering).

In a similar fashion, personal biometric data obtained from sensors such as heart rate monitors, fingerprint sensors, cameras, microphones, human input devices, and the like may be used to uniquely identify a person. As a result, the system may utilize the presently described configurations to ensure that only an authorized service provider (a trusted agent or trusted remote service) has access to such data. Depending on the context, some sensor data may require integrity protection, whereas other sensor data may also require confidentiality protection. Both objectives may be obtained with the presently described techniques and configurations.

Figure 4:
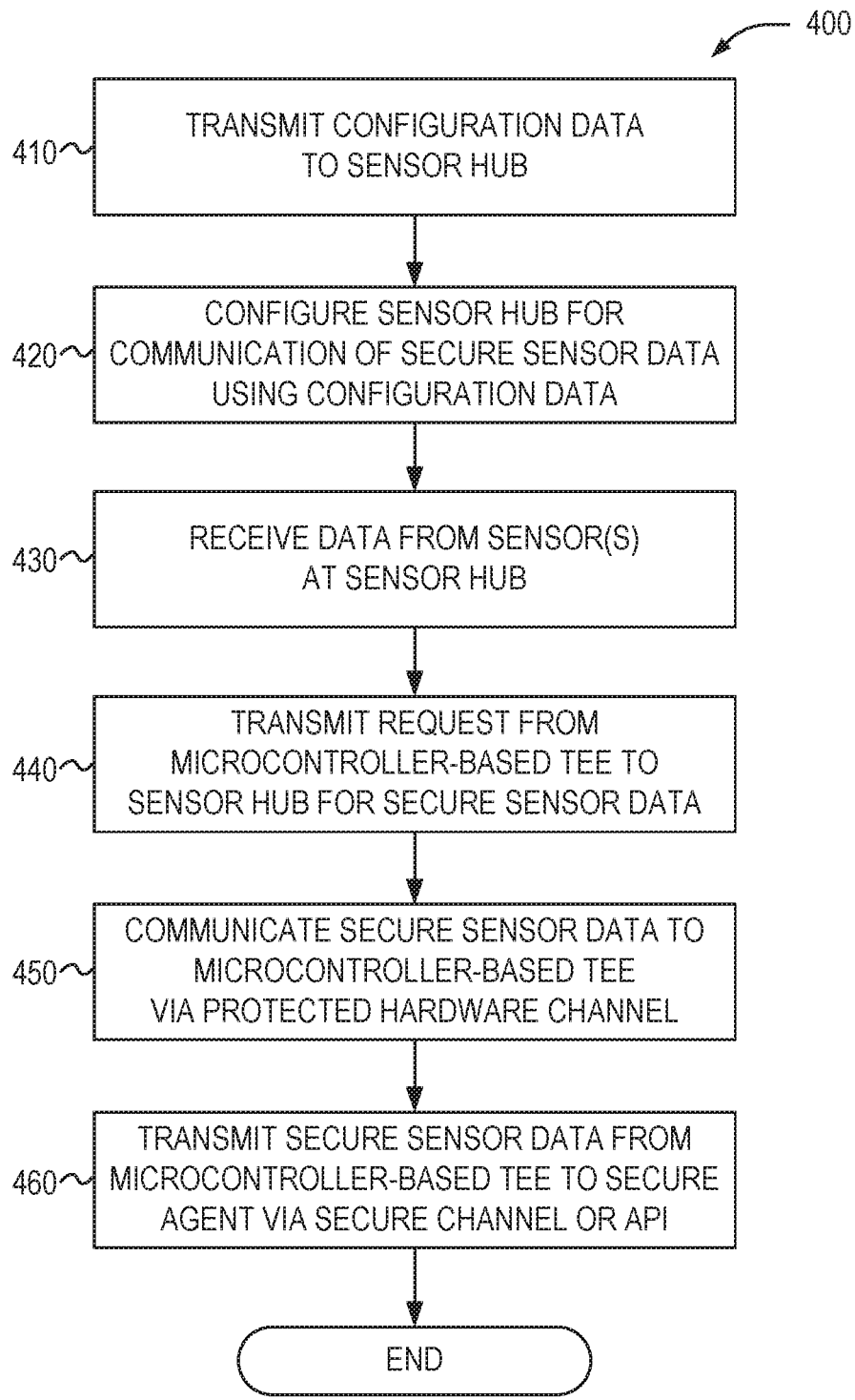
FIG. 4 illustrates a flowchart of a method for establishing and securing a communication link with a microcontroller-based Trusted Execution Environment, according to an example.

FIG. 4 provides a flowchart 400 of a method for establishing and securing a communication link with a microcontroller-based TEE, according to an example. The following operations of the flowchart 400 are described in the context of electronic operations performed by a sensor hub and microcontroller-based TEE, although in some examples, some of the operations may be performed by other processing circuitry and system components.

The flowchart 400 depicts operations for transmitting configuration data from the microcontroller-based TEE to the sensor hub (operation 410) and configuring the sensor hub using the configuration data (operation 420). In some examples, these operations are optional. For example, the hub may be configured to establish access control parameters for further communication of secure sensor data via the microcontroller TEE, such as to establish a geofence which requires data from certain sensors captured at a certain location to be securely handled in the computing system. A variety of configuration data settings may be implemented in the sensor hub or in respective sensors.

The flowchart 400 further depicts operations for receiving data from the one or more respective sensors at the sensor hub (operation 430), and transmitting a request from the microcontroller-based TEE to the sensor hub to obtain secure sensor data (operation 440). In other examples, the data may be pushed from the sensor hub to the microcontroller-based TEE based on a defined configuration setting.

As a result of the request or the data push, the secure sensor data is transmitted to the microcontroller-based TEE via a protected hardware channel (operation 450). This protected hardware channel, which operates outside of the operating system, serves as the entry point for the sensor data into a trusted environment. The microcontroller-based TEE may then transmit the secure sensor data to a secure agent (e.g., a software application of the TEE or another TEE) using a secure channel, API, or other data communication interface (operation 460).

Figure 5:
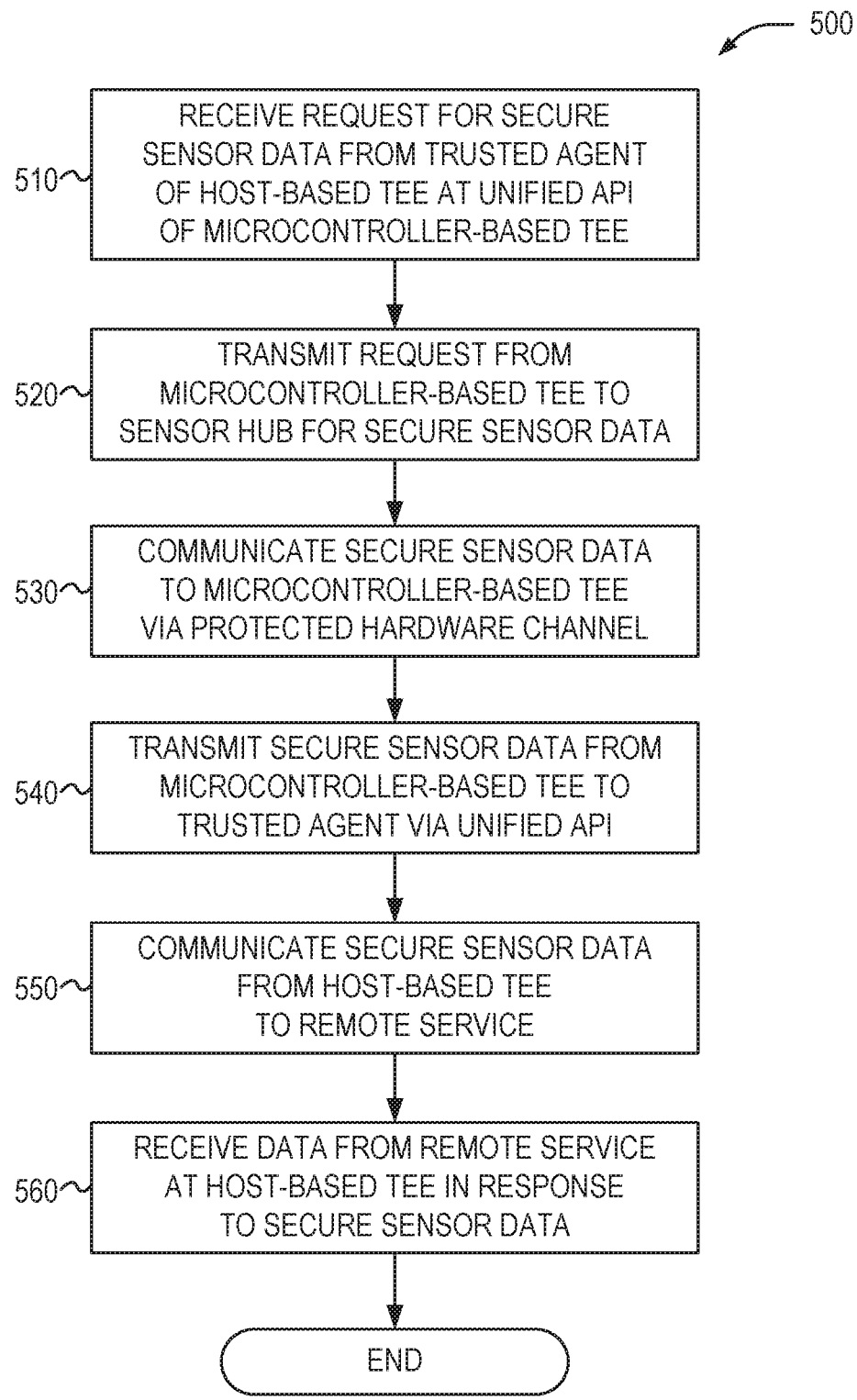
FIG. 5 illustrates a flowchart of a method for establishing and securing a communication link with a host-based Trusted Execution Environment, according to an example.

FIG. 5 illustrates a flowchart 500 of a method for establishing and securing a communication link with a host-based TEE, according to an example. As shown, the following operations of flowchart 500 may be implemented by a combination of microcontroller-based TEE operations and host-based TEE operations. As an extension of the operations depicted in FIG. 4, the operations in FIG. 5 also may be performed by other processing circuitry and system components.

The flowchart 500 depicts operations occurring before the acquisition of secure sensor data at the microcontroller-based TEE. For example, the microcontroller-based TEE may receive and process a request for the secure sensor data, at a unified API (operation 510). This request may originate from a trusted agent (e.g., a trusted software application) operating in the host-based TEE, which has established a secure communication session to the microcontroller-based TEE. In response to this request, the microcontroller-based TEE may transmit a request to the sensor hub, over the protected hardware channel, for the secure sensor data (operation 520). Similar to the techniques described above for FIG. 4, the secure sensor data is communicated to the microcontroller-based TEE via the protected hardware channel (operation 530).

After receipt and processing of the secure sensor data at the microcontroller TEE, the microcontroller TEE may transmit (e.g., forward) the secure sensor data to the trusted agent of the host-based TEE using the unified API (operation 540). This communication may be secured based on a pre-negotiated TEE communication security framework established at computer boot time.

After receipt of the secure sensor data at the trusted agent of the host-based TEE, further processing may occur. In some examples, this may include further transmitting the secure sensor data to a remote service from the host-based TEE (operation 550), and receiving data at the host-based TEE from the remote service, in response to the remote service processing the secure sensor data (operation 560). Such communications may be secured using SSL or any number of cryptographic communication techniques. Other variations to such external processing operations (and data communications) may occur in connection with use of the third party remote service.

Figure 6:
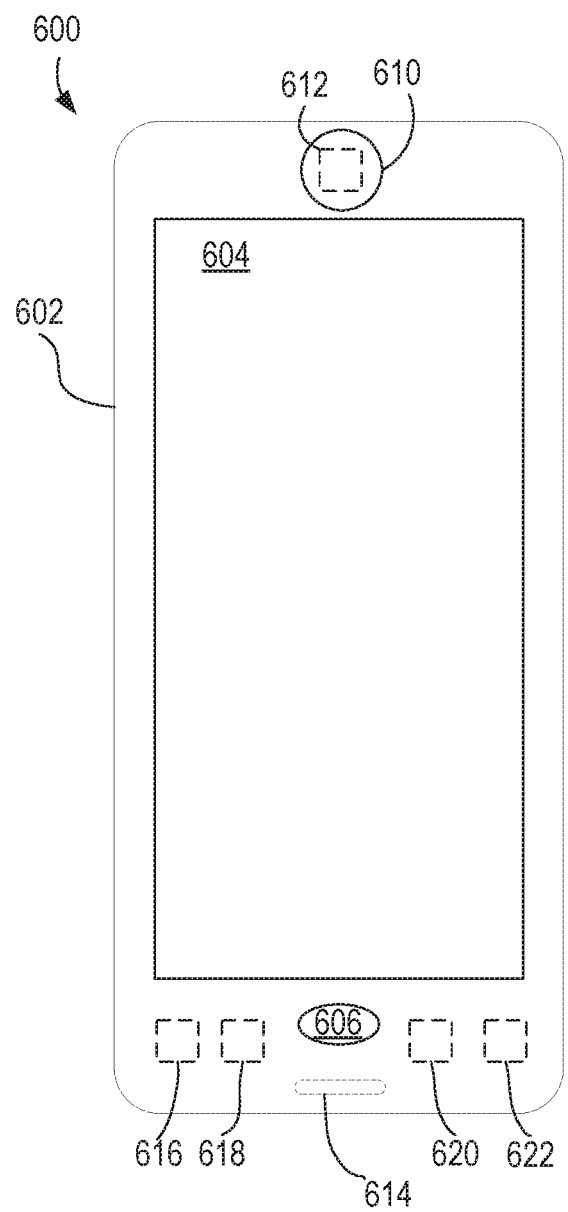
FIG. 6 illustrates a block diagram of some of the components of an example mobile computing device, according to an example.

FIG. 6 is a block diagram illustrating some of the components of an example mobile computing device 600 according to an example, which may include a SoC or other internal circuitry to embody the configuration and techniques for the secure sensor data routing discussed above. The mobile computing device 600 is illustrated as a smartphone in this example, though it will be understood that the mobile computing device 600 is representative of other types of computing devices that may include more or fewer sensors or other features than example mobile computing device 600.

As shown, the mobile computing device 600 includes a housing 602 that encloses the interior components such as processing circuitry and one or more sensors. In some examples, the housing 602 may provide access to the interior of the mobile computing device 600 to some degree with a user-removable cover, whereas in devices having a design that does not facilitate user access to the interior, housing 602 may nonetheless have a provision for permitting access to technicians so that certain components may be repaired or replaced if needed. In another example, housing 602 may be formed or assembled in a permanent fashion to prevent access to the interior of the device.

The mobile computing device 600 further includes a touchscreen 604, which may form a part of the overall enclosure of the mobile computing device 600 in cooperation with housing 602. Touchscreen 604 includes hardware that functions as an output device (e.g., an LED screen for visual display, power and controller circuitry, etc.), and an input device generally layered over the visual display and formed from a suitable touch-sensitive technology (e.g., capacitive, resistive, optical, ultrasonic, etc.), along with the corresponding detection and power circuitry. Additionally, the mobile computing device 600 includes a user input device 606, which in this example represents one or more user-operable input devices, such as button(s), keypad, keyboard, trackpad, mouse, etc.

As further depicted in FIG. 6, mobile computing device 600 has several sensing transducers, the physical stimulation of which produces signaling that may be sampled, digitized, and stored as captured data. A camera 610 includes an image sensor 612, along with additional hardware for digitizing, processing, and storing portions of the image sensor 612 output. The camera 610 also includes optics that may form a portion of housing 602. The camera 610 may record still images, motion video, or both.

A microphone 614 may include audio capture circuitry that samples, digitizes, and stores portions of the signaling produced by the microphone 614 in response to sensed acoustic stimulus. Microphone 614 is typically activated together with camera 610 when mobile computing device 600 is operated to record videos.

Global positioning system (GPS) receiver 616 may include an antenna and radio receiver circuitry to receive multiple Global Navigation Satellite System (GNSS) signals being broadcast by a constellation of Earth-orbiting satellites, along with processing circuitry to discern the current position on the Earth of mobile computing device 600. An accelerometer 618 may include a multi-axis sensor that produces signaling in response to changes in motion, and electronics to sample and digitize that signaling. A magnetometer 620 may include sensor components and supporting circuitry that detect the direction and intensity of the ambient magnetic field, or any externally-applied magnetic fields. A biometric sensor 622 may include an array of sensors for measuring a biometric indicator, such as a user's fingerprint, along with supporting circuitry.

Figure 7:
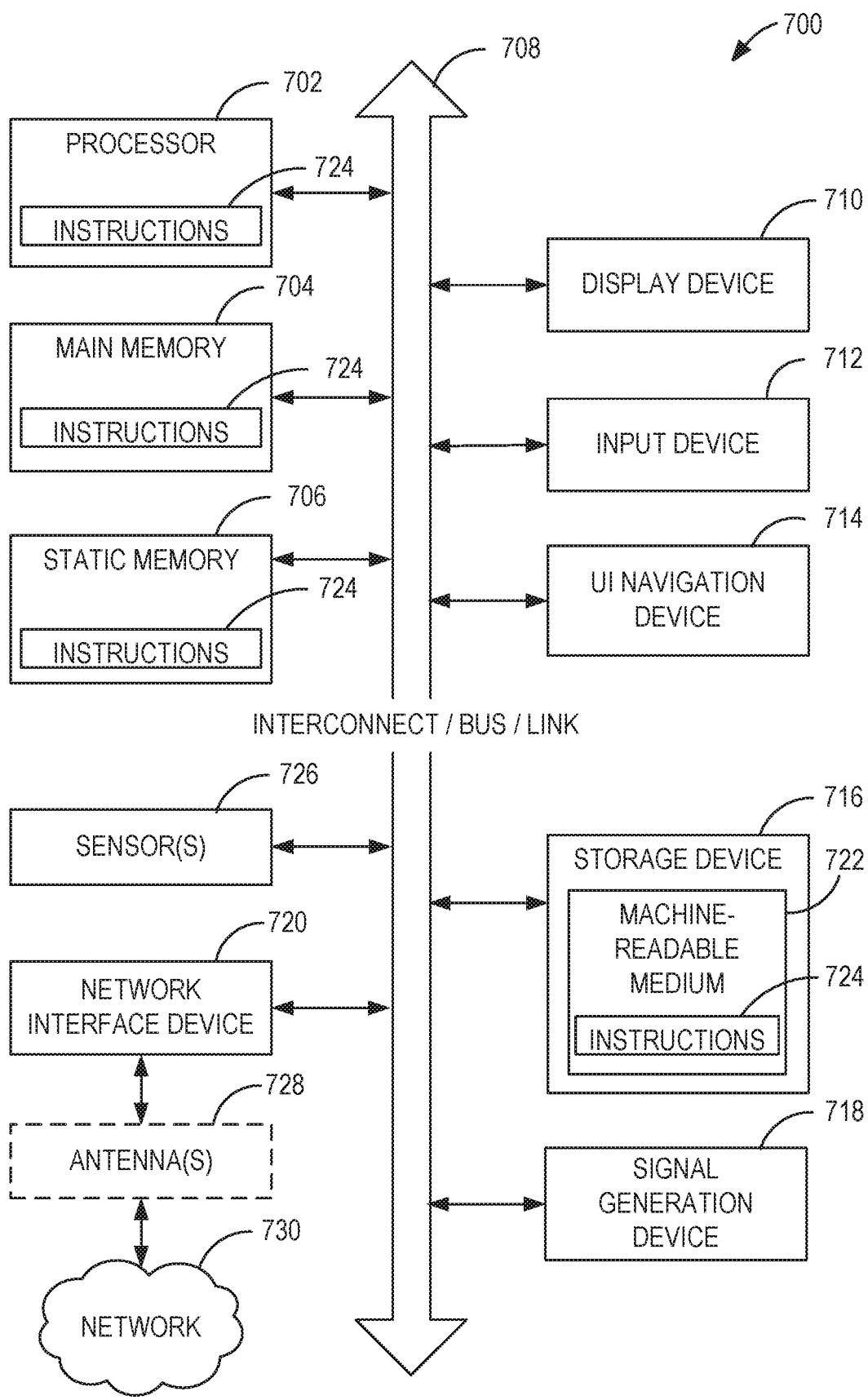
FIG. 7 illustrates a block diagram for an example computer architecture upon which any one or more of the techniques (e.g., operations, processes, methods, and methodologies) discussed herein may be performed, according to an example.

FIG. 7 is a block diagram illustrating a machine in the example form of a computer system 700), within which a set or sequence of instructions may be executed to cause the machine to perform any one of the methodologies discussed herein, according to an example embodiment. The machine may be the mobile computing device 600 embodying the techniques described above for FIGS. 1-6, or another computing device embodied as a personal computer (PC), a tablet PC, a hybrid tablet/notebook PC, a personal digital assistant (PDA), a mobile telephone or smartphone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via an interconnect 708 (e.g., a link, a bus, etc.). In some examples, such as in certain system-on-chip (SoC) configurations, the processor 702 and main memory 704 may be integrated into a single fabricated chip or circuitry, and may communicate with each other using an internal interface. The computer system 700 may further include a video display unit 710, an alphanumeric input device 712 (e.g., a keyboard), and a user interface (UI) navigation device 714 (e.g., a mouse). In an example, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720 (which may include or operably communicate with a network 730 using one or more antennas 728, transceivers, or other wireless communications hardware), and one or more sensors 726, such as a global positioning system (GPS) sensor, compass, accelerometer, gyroscope, magnetometer, location sensor, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 730 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic and software of a number of components, modules, or mechanisms. Such components are tangible entities (e.g., hardware and software-configured hardware) capable of performing specified operations and may be configured or arranged in a certain manner. In an example, circuitry or circuit sets may be arranged (e.g., internally or with respect to external entities such as other circuitry or circuit sets) in a specified manner as such components. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the component may be embodied or programmed by instructions of a machine readable medium. In an example, software, when executed by the underlying hardware of the component, causes the hardware to perform the specified operations. Thus, such components, modules, or mechanisms are understood to encompass a tangible entity, be that an entity that is physically constructed, specifically configured, temporarily configured, adapted, or programmed to operate in a specified manner or to perform part or all of any operations described herein.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus, comprising: a sensor hub, the sensor hub coupled to a sensor, the sensor hub to receive sensor data from the sensor; a microcontroller, the microcontroller coupled to the sensor hub via a secure hardware channel, the microcontroller to perform operations that: execute a trusted execution environment (TEE); receive in the TEE, via the secure hardware channel, the sensor data; and communicate, from the TEE, the sensor data to a trusted agent, the trusted agent in secure communication with the TEE In Example 2, the subject matter of Example 1 optionally includes: a second sensor, wherein the sensor hub is further coupled to the second sensor, and wherein the sensor data includes data from the second sensor.

In Example 3, the subject matter of any one or more of Examples 1-2 optionally include, wherein the trusted agent in secure communication with the TEE is provided from a host-based TEE, wherein the host-based TEE is executed within an operating system, and wherein the operations of the microcontroller that communicate the sensor data to the trusted agent, include operations that: establish an application programming interface (API); receive a request from the host-based TEE, via the API, for the sensor data; request, from the sensor hub via the secure hardware channel, the sensor data; and transmit, in response to receipt of the sensor data from the sensor hub, the sensor data via the API to the host-based TEE.

In Example 4, the subject matter of Example 3 optionally includes, wherein the operations of the microcontroller that communicate the sensor data to the trusted agent, include operations that: use a symmetric keyset established between the TEE and the host-based TEE for communications of via the API, wherein the symmetric keyset is distributed to the TEE and the host-based TEE by central processing unit (CPU) microcode of a CPU in a computing system at boot time of the computing system, the computing system including the apparatus.

In Example 5, the subject matter of any one or more of Examples 3-4 optionally include, wherein the trusted agent provided from the host-based TEE is a software application executing in the host-based TEE, and wherein the software application is in communication with a remote server via a secure connection, the software application to communicate the sensor data to the remote server.

In Example 6, the subject matter of any one or more of Examples 3-5 optionally include, wherein the trusted agent provided from the host-based TEE is a software application executing in the host-based TEE, wherein the software application is in communication with an external data service via a secure connection, and wherein the external data service communicates configuration data for the sensor from the external data service to the software application via the secure connection; wherein the microcontroller is further to perform operations that: receive the configuration data, via the API, from the host-based TEE; and communicate the configuration data to the sensor hub, the sensor hub to implement the configuration data for the sensor.

In Example 7, the subject matter of any one or more of Examples 1-6 optionally include, wherein the trusted agent in communication with the TEE is provided from an application operated by the microcontroller, and wherein the operations of the microcontroller that communicate the sensor data to the trusted agent, include operations that: establish an application programming interface (API); receive a request from the application operated by the microcontroller, via the API, for sensor data; request, from the sensor hub via the secure hardware channel, the sensor data; and transmit, in response to receipt of the sensor data from the sensor hub, the sensor data via the API to the application operated by the microcontroller.

In Example 8, the subject matter of any one or more of Examples 1-7 optionally include, wherein a first set of the sensor data is provided from the sensor hub and received in the TEE in response to a pull request from the TEE, and wherein a second set of the sensor data is provided from the sensor hub and received in the TEE in response to a push from the sensor hub.

In Example 9, the subject matter of any one or more of Examples 1-8 optionally include, wherein the microcontroller is further to perform operations that: receive an indication from the trusted agent to register for sensor events from the sensor; wherein the sensor data matches one or more of the sensor events from the sensor; and wherein, in response to receipt of the sensor data in the TEE via the secure hardware channel, the sensor data is communicated to the trusted agent.

In Example 10, the subject matter of Example 9 optionally includes, wherein the microcontroller is further to perform operations that: receive an indication from a second trusted agent to register for the sensor events from the sensor; and in response to receipt of the sensor data in the TEE via the secure hardware channel, multicast the sensor data from the TEE to the trusted agent and the second trusted agent.

In Example 11, the subject matter of any one or more of Examples 1-10 optionally include, wherein the apparatus is a system-on-chip including respective circuitry components for the sensor hub and the microcontroller.

In Example 12, the subject matter of any one or more of Examples 1-11 optionally include the sensor to produce the sensor data.

Example 13 is a computing device, comprising the apparatus of any one or more of Examples 1-13.

Example 14, is a system-on-chip circuitry, comprising the apparatus of any one or more of Examples 1-11.

Example 15 is a method, comprising electronic operations, which when performed by circuitry of a computing device, causes the computing device to perform the electronic operations including: receiving, at a sensor hub of the computing device, sensor data from a sensor of the computing device; communicating, to a trusted execution environment operated by a microcontroller of the computing device, the sensor data, wherein the data is provided via a dedicated secure hardware channel; and communicating, from the trusted execution environment operated by the microcontroller, the sensor data to a trusted agent operating in the computing system in a secure communication In Example 16, the subject matter of Example 15 optionally includes, the electronic operations further including: communicating, from the trusted agent operating in the computing system, the sensor data to third party external to the computing system in a second secure communication.

Example 17 is at least one machine readable storage medium, comprising a plurality of instructions that, responsive to being executed with processor circuitry of a computing device, cause the computing device to: receive, at a sensor hub of the computing device, data from a sensor of the computing device, communicate, to a trusted execution environment operated by a microcontroller of the computing device, the sensor data, wherein the data is provided via a dedicated secure hardware channel; and communicate, from the trusted execution environment operated by the microcontroller, the sensor data to a trusted agent operating in the computing system in a secure communication In Example 18, the subject matter of Example 17 optionally includes additional instructions that: communicate, from the trusted agent operating in the computing system, the sensor data to third party external to the computing system in a second secure communication.

Example 19 is a method, comprising electronic operations, which when performed by circuitry of a computing device, causes the computing device to perform the electronic operations including: executing a trusted execution environment (TEE); receiving in the TEE, from a sensor hub via a secure hardware channel, sensor data from a sensor; and communicating, from the TEE, the sensor data to a trusted agent, the trusted agent in secure communication with the TEE In Example 20, the subject matter of Example 19 optionally includes, wherein the sensor data includes data from a second sensor, wherein the sensor hub is coupled to the sensor and the second sensor.

In Example 21, the subject matter of any one or more of Examples 19-20 optionally include, wherein the trusted agent in secure communication with the TEE is provided from a host-based TEE, wherein the host-based TEE is executed by an operating system, and wherein the operations of communicating the sensor data to the trusted agent, include: establishing an application programming interface (API); receiving a request from the host-based TEE, via the API, for the sensor data; requesting, from the sensor hub via the secure hardware channel, the sensor data; and transmitting, in response to receipt of the sensor data from the sensor hub, the sensor data via the API to the host-based TEE.

In Example 22, the subject matter of Example 21 optionally includes, wherein the operations of communicating the sensor data to the trusted agent, include: using a symmetric keyset established between the TEE and the host-based TEE for communications of via the API, wherein the symmetric keyset is distributed to the TEE and the host-based TEE by central processing unit (CPU) microcode of a CPU in the computing device at boot time of the computing device.

In Example 23, the subject matter of any one or more of Examples 21-22 optionally include, wherein the trusted agent provided from the host-based TEE is a software application executing in the host-based TEE, and wherein the software application is in communication with a remote server via a secure connection, the software application to communicate the sensor data to the remote server.

In Example 24, the subject matter of any one or more of Examples 21-23 optionally include, wherein the trusted agent provided from the host-based TEE is a software application executing in the host-based TEE, wherein the software application is in communication with an external data service via a secure connection, and wherein the external data service communicates configuration data for the sensor from the external data service to the software application via the secure connection, and wherein the electronic operations of the method further include: receiving the configuration data, via the API, from the host-based TEE; and communicating the configuration data to the sensor hub, the sensor hub to implement the configuration data for the sensor.

In Example 25, the subject matter of any one or more of Examples 19-24 optionally include, wherein the trusted agent in communication with the TEE is provided from an application operated by a microcontroller, and wherein the operations of communicating the sensor data to the trusted agent, include: establishing an application programming interface (API); receiving a request from the application operated by the microcontroller, via the API, for sensor data; requesting, from the sensor hub via the secure hardware channel, the sensor data; and transmitting, in response to receipt of the sensor data from the sensor hub, the sensor data via the API to the application operated by the microcontroller.

In Example 26, the subject matter of any one or more of Examples 19-25 optionally include, wherein a first set of the sensor data is provided from the sensor hub and received in the TEE in response to a pull request from the TEE, and wherein a second set of the sensor data is provided from the sensor hub and received in the TEE in response to a push from the sensor hub.

In Example 27, the subject matter of any one or more of Examples 19-26 optionally include, wherein the electronic operations of the method further include: receiving an indication from the trusted agent to register for sensor events from the sensor; wherein the sensor data matches one or more of the sensor events from the sensor, and wherein, in response to receipt of the sensor data in the TEE via the secure hardware channel, the sensor data is communicated to the trusted agent.

In Example 28, the subject matter of Example 27 optionally includes, wherein the electronic operations of the method further include: receiving an indication from a second trusted agent to register for the sensor events from the sensor; and in response to receipt of the sensor data in the TEE via the secure hardware channel, multicasting the sensor data from the TEE to the trusted agent and the second trusted agent.

Example 29 is a machine-readable medium including instructions, which when executed by a computing system, cause the computing system to perform any of the methods of Examples 19-28.

Example 30 is an apparatus comprising means for performing any of the methods of Examples 19-28.

Example 31 is at least one machine readable storage medium, comprising a plurality of instructions that, responsive to being executed with processor circuitry of a computing device, cause the computing device to: execute a trusted execution environment (TEE); receive in the TEE, from a sensor hub via a secure hardware channel, sensor data from a sensor; and communicate, from the TEE, the sensor data to a trusted agent, the trusted agent in secure communication with the TEE In Example 32, the subject matter of Example 31 optionally includes, wherein the sensor hub is further coupled to a second sensor, and wherein the sensor data includes data from the second sensor.

In Example 33, the subject matter of any one or more of Examples 31-32 optionally include, wherein the trusted agent in secure communication with the TEE is provided from a host-based TEE, wherein the host-based TEE is executed by an operating system, and wherein the operations that communicate the sensor data to the trusted agent, further include operations that: establish an application programming interface (API); receive a request from the host-based TEE, via the API, for the sensor data; request, from the sensor hub via the secure hardware channel, the sensor data; and transmit, in response to receipt of the sensor data from the sensor hub, the sensor data via the API to the host-based TEE.

In Example 34, the subject matter of Example 33 optionally includes, wherein the operations that communicate the sensor data to the trusted agent, further include operations that: use a symmetric keyset established between the TEE and the host-based TEE for communications of via the API, wherein the symmetric keyset is distributed to the TEE and the host-based TEE by central processing unit (CPU) microcode of a CPU in the computing device at boot time of the computing device.

In Example 35, the subject matter of any one or more of Examples 33-34 optionally include, wherein the trusted agent provided from the host-based TEE is a software application executing in the host-based TEE, and wherein the software application is in communication with a remote server via a secure connection, the software application to communicate the sensor data to the remote server.

In Example 36, the subject matter of any one or more of Examples 33-35 optionally include, wherein the trusted agent provided from the host-based TEE is a software application executing in the host-based TEE, wherein the software application is in communication with an external data service via a secure connection, and wherein the external data service communicates configuration data for the sensor from the external data service to the software application via the secure connection; wherein the instructions further cause the computing device to: receive the configuration data, via the API, from the host-based TEE; and communicate the configuration data to the sensor hub, the sensor hub to implement the configuration data for the sensor.

In Example 37, the subject matter of any one or more of Examples 31-36 optionally include, wherein the trusted agent in communication with the TEE is provided from an application operated by a microcontroller, and wherein the operations that communicate the sensor data to the trusted agent, further include operations that: establish an application programming interface (API); receive a request from the application operated by the microcontroller, via the API, for sensor data; request, from the sensor hub via the secure hardware channel, the sensor data; and transmit, in response to receipt of the sensor data from the sensor hub, the sensor data via the API to the application operated by the microcontroller.

In Example 38, the subject matter of any one or more of Examples 31-37 optionally include, wherein a first set of the sensor data is provided from the sensor hub and received in the TEE in response to a pull request from the TEE, and wherein a second set of the sensor data is provided from the sensor hub and received in the TEE in response to a push from the sensor hub.

In Example 39, the subject matter of any one or more of Examples 31-38 optionally include, wherein the instructions further cause the computing device to: receive an indication from the trusted agent to register for sensor events from the sensor; wherein the sensor data matches one or more of the sensor events from the sensor; and wherein, in response to receipt of the sensor data in the TEE via the secure hardware channel, the sensor data is communicated to the trusted agent.

In Example 40, the subject matter of Example 39 optionally includes, wherein the instructions further cause the computing device to: receive an indication from a second trusted agent to register for the sensor events from the sensor; in response to receipt of the sensor data in the TEE via the secure hardware channel, multicast the sensor data from the TEE to the trusted agent and the second trusted agent.

Example 41 is an internet-accessible computing server, comprising: at least one processor; and at least one storage medium, including computer-readable instructions that, responsive to being executed with the at least one processor, perform electronic operations in the computing server including: hosting a cloud application accessible by a remote computing device via an internet connection; transmitting, from the cloud application to the remote computing device via the internet connection, request data to a host trusted execution environment (TEE) of the remote computing device, wherein the host TEE of the remote computing device communicates the request data to a sensor hub of the remote computing device via a microcontroller-based TEE of the remote computing device; and receiving, at the cloud application via the internet connection, response data from the host TEE, the response data from the host TEE being provided by the sensor hub via the microcontroller-based TEE in response to the request data communicated to the sensor hub In Example 42, the subject matter of Example 41 optionally includes, wherein the request data transmitted from the cloud application to the host TEE of the remote computing device indicates a configuration to enable or disable a sensor from providing sensor data via the sensor hub based on one or more conditions, wherein the configuration to enable or disable the sensor from providing sensor data via the sensor hub prevents the sensor hub from providing sensor data to applications of the remote computing device not operating in a TEE based on the set of one or more conditions, and wherein the one or more conditions are based an origin of the sensor data or a time schedule.

Example 43 is an internet-accessible computing server, comprising: processor circuitry; memory circuitry; and an authorized execution component, implemented with operation of the processor circuitry and the memory circuitry, the authorized execution component to provide authorization for a trusted execution environment (TEE) application on a remote computing platform to obtain secure sensor data from a sensor hub within the remote computing platform, wherein the secure sensor data is provided from the sensor hub to the TEE application via a microcontroller-based TEE of the remote computing platform In Example 44, the subject matter of Example 43 optionally includes, wherein the authorized execution component further provides authorization for the TEE application to access the secure sensor data from the sensor hub based on geo-location fencing, the geo-location fencing defining a location-based conditions when secure sensor data can be accessed from the sensor hub by the TEE application.

Example 45 is an apparatus, comprising: means for executing a trusted execution environment (TEE); means for receiving in the TEE, from a sensor hub via a secure hardware channel, sensor data from a sensor; and means for communicating, from the TEE, the sensor data to a trusted agent, the trusted agent in secure communication with the TEE In Example 46, the subject matter of Example 45 optionally includes, wherein the sensor data includes data from a second sensor, wherein the sensor hub is coupled to the sensor and the second sensor.

In Example 47, the subject matter of any one or more of Examples 45-46 optionally include: means for establishing an application programming interface (API); means for receiving a request from a host-based TEE, via the API, for the sensor data; means for requesting, from the sensor hub via the secure hardware channel, the sensor data; and means for transmitting, in response to receipt of the sensor data from the sensor hub, the sensor data via the API to the host-based TEE; wherein the trusted agent in secure communication with the TEE is provided from the host-based TEE, and wherein the host-based TEE is executed by an operating system.

In Example 48, the subject matter of Example 47 optionally includes: means for using a symmetric keyset established between the TEE and the host-based TEE for communications of via the API, wherein the symmetric keyset is distributed to the TEE and the host-based TEE by central processing unit (CPU) microcode of a CPU at boot time.

In Example 49, the subject matter of any one or more of Examples 47-48 optionally include: means for implementing the trusted agent as a software application in the host-based TEE, wherein the software application is in communication with a remote server via a secure connection, the software application to communicate the sensor data to the remote server.

In Example 50, the subject matter of any one or more of Examples 47-49 optionally include: means for implementing the trusted agent as a software application in the host-based TEE, wherein the software application is in communication with an external data service via a secure connection, and wherein the external data service communicates configuration data for the sensor from the external data service to the software application via the secure connection, means for receiving the configuration data, via the API, from the host-based TEE; and means for communicating the configuration data to the sensor hub, the sensor hub to implement the configuration data for the sensor.

In Example 51, the subject matter of any one or more of Examples 45-50 optionally include: means for establishing an application programming interface (API); means for receiving a request from an application operated by a microcontroller, via the APL for sensor data; means for requesting, from the sensor hub via the secure hardware channel, the sensor data, and means for transmitting, in response to receipt of the sensor data from the sensor hub, the sensor data via the API to the application operated by the microcontroller; wherein the trusted agent in communication with the TEE is provided from the application operated by the microcontroller.

In Example 52, the subject matter of any one or more of Examples 45-51 optionally include: means for providing a first set of the sensor data from the sensor hub in response to a pull request from the TEE; and means for providing a second set of the sensor data from the sensor hub in response to a push from the sensor hub.

In Example 53, the subject matter of any one or more of Examples 45-52 optionally include: means for receiving an indication from the trusted agent to register for sensor events from the sensor, wherein the sensor data matches one or more of the sensor events from the sensor; and means for communicating, in response to receipt of the sensor data in the TEE via the secure hardware channel, the sensor data to the trusted agent.

In Example 54, the subject matter of Example 53 optionally includes: means for receiving an indication from a second trusted agent to register for the sensor events from the sensor; means for multicasting sensor data from the TEE to the trusted agent and the second trusted agent in response to receipt of the sensor data in the TEE via the secure hardware channel.

Example 55 is an apparatus, comprising: means for hosting a cloud application accessible by a remote computing device via an internet connection; means for transmitting, from the cloud application to the remote computing device via the internet connection, request data to a host trusted execution environment (TEE) of the remote computing device, wherein the host TEE of the remote computing device communicates the request data to a sensor hub of the remote computing device via a microcontroller-based TEE of the remote computing device; and means for receiving, at the cloud application via the internet connection, response data from the host TEE, the response data from the host TEE being provided by the sensor hub via the microcontroller-based TEE in response to the request data communicated to the sensor hub In Example 56, the subject matter of Example 55 optionally includes: means for indicating, in the request data, a configuration to enable or disable a sensor from providing sensor data via the sensor hub based on one or more conditions, wherein the configuration to enable or disable the sensor from providing sensor data via the sensor hub prevents the sensor hub from providing sensor data to applications of the remote computing device not operating in a TEE based on the set of one or more conditions, and wherein the one or more conditions are based on an origin of the sensor data or a time schedule.

Example 57 is an apparatus, comprising: means for providing authorization for a trusted execution environment (TEE) application on a remote computing platform to obtain secure sensor data from a sensor hub within the remote computing platform; and means for controlling conditions of when the secure sensor data is provided from the sensor hub to the TEE application via a microcontroller-based TEE of the remote computing platform In Example 58, the subject matter of Example 57 optionally includes: means for providing authorization for the TEE application to access the secure sensor data from the sensor hub based on geo-location fencing, the geo-location fencing defining a location-based conditions when secure sensor data can be accessed from the sensor hub by the TEE application.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus, comprising:
   a sensor hub, the sensor hub coupled to a first sensor and a second sensor, the sensor hub to receive secure sensor data from the first sensor; and
   a microcontroller, the microcontroller coupled to the sensor hub via a secure hardware channel, the microcontroller to perform operations that:
   execute a trusted execution environment (TEE);
   transmit, from the TEE to the sensor hub via the secure hardware channel, configuration data for the sensor hub, wherein the configuration data provides a set of conditions for access to secure sensor data based on origin of the secure sensor data and based on values of sensor data of the second sensor coupled to the sensor hub;
   wherein the sensor hub is configured, based on the configuration data, to provide secure access to the secure sensor data via the TEE when the sensor data of the second sensor is in accordance to the set of conditions;
   wherein the sensor hub is configured, based on the configuration data, to deny unsecure access to the secure sensor data for the unsecure access requested on an unsecure hardware channel, wherein the unsecure access occurs independent of the TEE;
   receive in the TEE, via the secure hardware channel, the secure sensor data; and
   communicate, from the TEE, the secure sensor data to a trusted agent, the trusted agent in secure communication with the TEE, wherein the trusted agent is provided from a host-based TEE.

2. The apparatus of claim 1, further comprising:
   a third sensor, wherein the sensor hub is further coupled to the third sensor, and wherein the secure sensor data includes data from the third sensor.

3. The apparatus of claim 1, wherein the host-based TEE is executed within an operating system, and wherein the operations of the microcontroller that communicate the secure sensor data to the trusted agent, include operations that:
   establish an application programming interface (API);
   receive a request from the host-based TEE, via the API, for the secure sensor data;
   request, from the sensor hub via the secure hardware channel, the secure sensor data; and
   transmit, in response to receipt of the secure sensor data from the sensor hub, the secure sensor data via the API to the host-based TEE.

4. The apparatus of claim 3, wherein the operations of the microcontroller that communicate the secure sensor data to the trusted agent, include operations that:
   use a symmetric keyset established between the TEE and the host-based TEE for communications of via the API, wherein the symmetric keyset is distributed to the TEE and the host-based TEE by central processing unit (CPU) microcode of a CPU in a computing system at boot time of the computing system, the computing system including the apparatus.

5. The apparatus of claim 3, wherein the trusted agent provided from the host-based TEE is a software application executing in the host-based TEE, and wherein the software application is in communication with a remote server via a secure connection, the software application to communicate the secure sensor data to the remote server.

6. The apparatus of claim 3, wherein the trusted agent provided from the host-based TEE is a software application executing in the host-based TEE, wherein the software application is in communication with an external data service via a secure connection, and wherein the external data service communicates configuration data for the first sensor from the external data service to the software application via the secure connection;
   wherein the microcontroller is further to perform operations that:
   receive the configuration data, via the API, from the host-based TEE; and
   communicate the configuration data to the sensor hub, the sensor hub to implement the configuration data for the first sensor.

7. The apparatus of claim 1, wherein the trusted agent in communication with the TEE is provided from an application operated by the microcontroller, and wherein the operations of the microcontroller that communicate the secure sensor data to the trusted agent, include operations that:
   establish an application programming interface (API);
   receive a request from the application operated by the microcontroller, via the API, for secure sensor data;
   request, from the sensor hub via the secure hardware channel, the secure sensor data; and
   transmit, in response to receipt of the secure sensor data from the sensor hub, the secure sensor data via the API to the application operated by the microcontroller.

8. The apparatus of claim 1, wherein a first set of the secure sensor data is provided from the sensor hub and received in the TEE in response to a pull request from the TEE, and wherein a second set of the secure sensor data is provided from the sensor hub and received in the TEE in response to a push from the sensor hub.

9. The apparatus of claim 1, wherein the microcontroller is further to perform operations that:
   receive an indication from the trusted agent to register for sensor events from the first sensor;
   wherein the secure sensor data matches one or more of the sensor events from the first sensor; and
   wherein, in response to receipt of the secure sensor data in the TEE via the secure hardware channel, the secure sensor data is communicated to the trusted agent.

10. The apparatus of claim 9, wherein the microcontroller is further to perform operations that:
    receive an indication from a second trusted agent to register for the sensor events from the first sensor; and
    in response to receipt of the secure sensor data in the TEE via the secure hardware channel, multicast the secure sensor data from the TEE to the trusted agent and the second trusted agent.

11. At least one non-transitory machine readable storage medium, comprising a plurality of instructions that, responsive to being executed with processor circuitry of a computing device, cause the computing device to:

execute a trusted execution environment (TEE);
transmit, from the TEE to a sensor hub via a secure hardware channel, configuration data for the sensor hub, wherein the configuration data provides a set of conditions for access to secure sensor data of a first sensor based on origin of the secure sensor data and based on values of sensor data of a second sensor coupled to the sensor hub;
wherein the sensor hub is configured, based on the configuration data, to provide secure access to secure sensor data from the first sensor via the TEE when the sensor data of the second sensor is in accordance to the set of conditions;
wherein the sensor hub is configured, based on the configuration data, to deny unsecure access to the secure sensor data, the unsecure access requested on an unsecure channel, wherein the unsecure access occurs independent of the TEE;
receive in the TEE, from the sensor hub via the secure hardware channel, the secure sensor data from the first sensor; and
communicate, from the TEE, the secure sensor data to a trusted agent, the trusted agent in secure communication with the TEE, wherein the trusted agent is provided from a host-based TEE.

12. The non-transitory machine readable storage medium of claim 11, wherein the sensor hub is further coupled to a third sensor, and wherein the secure sensor data includes data from the third sensor.

13. The non-transitory machine readable storage medium of claim 11, wherein the host-based TEE is operated by an operating system, and wherein operations that communicate the secure sensor data to the trusted agent, further include operations that:
establish an application programming interface (API);
receive a request from the host-based TEE, via the API, for the secure sensor data;
request, from the sensor hub via the secure hardware channel, the secure sensor data; and
transmit, in response to receipt of the secure sensor data from the sensor hub, the secure sensor data via the API to the host-based TEE.

14. The non-transitory machine readable storage medium of claim 13, wherein the operations that communicate the secure sensor data to the trusted agent, further include operations that:
use a symmetric keyset established between the TEE and the host-based TEE for communications of via the API, wherein the symmetric keyset is distributed to the TEE and the host-based TEE by central processing unit (CPU) microcode of a CPU in the computing device at boot time of the computing device.

15. The non-transitory machine readable storage medium of claim 13, wherein the trusted agent provided from the host-based TEE is a software application executing in the host-based TEE, and wherein the software application is in communication with a remote server via a secure connection, the software application to communicate the secure sensor data to the remote server.

16. The non-transitory machine readable storage medium of claim 13, wherein the trusted agent provided from the host-based TEE is a software application executing in the host-based TEE, wherein the software application is in communication with an external data service via a secure connection, and wherein the external data service communicates configuration data for the first sensor from the external data service to the software application via the secure connection;
wherein the instructions further cause the computing device to:
receive the configuration data, via the API, from the host-based TEE; and
communicate the configuration data to the sensor hub, the sensor hub to implement the configuration data for the first sensor.

17. The non-transitory machine readable storage medium of claim 11, wherein the trusted agent in communication with the TEE is provided from an application operated by a microcontroller, and wherein operations that communicate the secure sensor data to the trusted agent, further include operations that:
establish an application programming interface (API);
receive a request from the application operated by the microcontroller, via the API, for secure sensor data;
request, from the sensor hub via the secure hardware channel, the secure sensor data; and
transmit, in response to receipt of the secure sensor data from the sensor hub, the secure sensor data via the API to the application operated by the microcontroller.

18. The non-transitory machine readable storage medium of claim 11, wherein a first set of the secure sensor data is provided from the sensor hub and received in the TEE in response to a pull request from the TEE, and wherein a second set of the secure sensor data is provided from the sensor hub and received in the TEE in response to a push from the sensor hub.

19. The non-transitory machine readable storage medium of claim 11, wherein the instructions further cause the computing device to:
receive an indication from the trusted agent to register for sensor events from the first sensor;
wherein the secure sensor data matches one or more of the sensor events from the first sensor; and
wherein, in response to receipt of the secure sensor data in the TEE via the secure hardware channel, the secure sensor data is communicated to the trusted agent.

20. A method, comprising electronic operations, which when performed by circuitry of a computing device, causes the computing device to perform the electronic operations including:
initiating a trusted execution environment (TEE);
transmitting, from the TEE to a sensor hub via a secure hardware channel, configuration data for the sensor hub, wherein the configuration data provides a set of conditions for access to secure sensor data of a first sensor based on origin of the secure sensor data and based on values of sensor data of a second sensor coupled to the sensor hub;
wherein the sensor hub is configured, based on the configuration data, to provide secure access to secure sensor data from the first sensor via the TEE when the sensor data of the second sensor is in accordance to the set of conditions;
wherein the sensor hub is configured, based on the configuration data, to deny unsecure access to the secure sensor data, the unsecure access requested on an unsecure hardware channel, wherein the unsecure access occurs independent of the TEE;
receiving in the TEE, from the sensor hub via the secure hardware channel, the secure sensor data from the first sensor; and communicating, from the TEE, the secure sensor data to a trusted agent, the trusted agent in secure communication with the TEE, wherein the trusted agent is provided from a host-based TEE.

21. The method of claim 20, wherein the secure sensor data includes data from a third sensor, wherein the sensor hub is coupled to the first sensor and the third sensor.

22. The method of claim 20, wherein the host-based TEE is executed by an operating system, and wherein the electronic operations of communicating the secure sensor data to the trusted agent, includes:
- establishing an application programming interface (API);
- receiving a request from the host-based TEE, via the API, for the secure sensor data;
- requesting, from the sensor hub via the secure hardware channel, the secure sensor data; and
- transmitting, in response to receipt of the secure sensor data from the sensor hub, the secure sensor data via the API to the host-based TEE.

* * * * *